(12) United States Patent
Biracree et al.

(10) Patent No.: US 6,985,549 B1
(45) Date of Patent: Jan. 10, 2006

(54) BLIND COST CRITERION TIMING RECOVERY

(75) Inventors: Stephen L. Biracree, Jamison, PA (US); Azzedine Touzni, Doylestown, PA (US); Thomas J. Endres, Ottsville, PA (US); Christopher H. Strolle, Fort Washington, PA (US); Samir N. Hulyalkar, Newtown, PA (US); Raúl A. Casas, Doylestown, PA (US)

(73) Assignee: ATI Research, Inc., Santa Clara, CA (US)

( * ) Notice: Subject to any disclaimer, the term of this patent is extended or adjusted under 35 U.S.C. 154(b) by 801 days.

(21) Appl. No.: 09/761,303

(22) Filed: Jan. 17, 2001

Related U.S. Application Data

(60) Provisional application No. 60/242,306, filed on Oct. 20, 2000.

(51) Int. Cl.
*H04L 7/00* (2006.01)

(52) U.S. Cl. ..................................... 375/355

(58) Field of Classification Search ................ 375/354, 375/355, 229, 232, 235, 316, 340
See application file for complete search history.

(56) References Cited

U.S. PATENT DOCUMENTS

| | | | |
|---|---|---|---|
| 5,282,225 A * | 1/1994 | Nikias et al. ................ | 375/232 |
| 5,311,546 A * | 5/1994 | Paik et al. ................... | 375/232 |
| 5,398,073 A * | 3/1995 | Wei ............................. | 348/487 |
| 5,675,394 A * | 10/1997 | Choi .......................... | 348/614 |
| 5,872,815 A | 2/1999 | Strolle et al. | |
| 5,877,720 A * | 3/1999 | Setty et al. ................. | 341/159 |
| 6,418,164 B1 * | 7/2002 | Endres et al. ............... | 375/232 |

OTHER PUBLICATIONS

"Uniqueness Of The Maximum Likelihood Estimates Of The Parameters Of An ARMA Model" by Karl J. Åström and Torsten Söderström, IEEE Transactions On Automatic Control, Dec. 1974, pps. 769-773.

"The Performance of Staggered Quadrature Amplitude Modulation in the Presence of Phase Jitter" by Richard D. Gitlin and Edmond Y. Ho, IEEE Transactions On Communications, vol. COM-23, No. 3, Mar. 1975, pps. 348-352.

"Timing Recovery In Digital Synchronous Data Receivers" by Kurt H. Mueller and Markus Müller, IEEE Transactions On Communications, vol. Com- 24, No. 5, May 1976, pps. 516-531.

"Practical Blind Demodulators For High-Order QAM Signals" by John R. Treichler, Michael G. Larimore and Jeffrey C. Harp, Proccedings of the IEEE, vol. 86, No. 10, Oct. 1998, pps. 1907-1926.

(Continued)

*Primary Examiner*—Kevin Burd
(74) *Attorney, Agent, or Firm*—Steve Mendelsohn

(57) ABSTRACT

Symbol timing recovery employs a blind cost criterion from the Bussgang class of functions, and its stochastic gradient, to generate a timing phase error used to adjust sampling of received symbols. For one implementation, the estimate is derived in accordance with the Constant Modulus (CM) criterion and its gradient via the CM algorithm (CMA), and the estimate is calculated from a sequence of samples. This estimate is then used to adjust the period and phase of the sample sequence toward the period and phase of the transmitted symbols, driving the timing phase error to zero. The values used may be either i) samples themselves, ii) processed (e.g., interpolated) samples, or iii) equalized and processed samples. In addition, timing phase error estimates for other cost criteria, including the least mean squares algorithm, may be generated. These timing phase error estimates are selected either alone or in combination for deriving the timing phase error used to adjust the period and phase of the sample sequence.

41 Claims, 9 Drawing Sheets

OTHER PUBLICATIONS

"Blind Equalization Using the Constant Modulus Criterion: A Review" by C. Richard Johnson, Jr., et al, Proceedings of the IEEE, vol. 86, No. 10, Oct. 1998, pps. 1927-1950.

"Global Convergence Of A Single-Axis Constant Modulus Algorithm" by A. Shah, S. Biracree, R. A. Casas, T. J. Endres, S. Hulyalkar, T. A. Schaffer and C. H. Strolle, Technical Memo, NxtWave Communications, Langhorne, PA.

"A New Approach to Multipath Corrections Of Constant Modulus Signals" by John R. Treichler and Brian G. Agee, IEEE Transactions On Acoustics, Speech, And Signal Processing, vol. ASSP-31, No. 2, Apr. 1983, pps. 459-471.

"Digital Communication," Lee and Messerschmitt, Appendix 17-B, Kluwer Academic Publishers, Norwell, MA, Second Edition, 1994.

"Self-Recovering Equalization and Carrier Tracking in Two-Dimensional Data Communication Systems" by D. N. Godard, IEEE Transactions on Communications, vol. 28, No. 11, pp. 1867-1875, Oct. 1980.

"Techniques for Adaptive Equalization of Digital Communication Systems" by R. W. Lucky, *Bell Systems Technical Journal*, vol. 45, No. 2, pp. 255-286, Feb. 1966.

"Blind Deconvolution," by Simon Haykin, Chapter 2, Prentice Hall, Englewood Cliffs, NJ, 1994, pps. 8-59.

* cited by examiner

NON IDEAL SAMPLING YIELDING ISI, τ≠0

BLIND COST CRITERION TIMING RECOVERY

CROSS-REFERENCE TO RELATED APPLICATIONS

This application claims the benefit of the filing date of U.S. provisional application No. 60/242,306, filed on Oct. 20, 2000.

BACKGROUND OF THE INVENTION

1. Field of the Invention

The present invention relates to symbol timing recovery in a receiver of a digital communications system.

2. Description of the Related Art

In many digital communications systems, a user generates digital information that is then processed into an encoded (e.g., error-correction encoded) and/or packetized stream of data. The stream of data is then divided into discrete blocks. Each of the blocks is mapped onto a corresponding one of a sequence of code or symbol values ("symbols") chosen from a pre-defined alphabet A, and generated with a period $T_s$, sometimes referred to as the "baud" rate. Symbols may then be used to modulate an analog, e.g., radio frequency (RF) carrier, in amplitude, phase, and/or frequency prior to physical transmission through the communication medium. Many methods of mapping exist and are well known in the art, and these pre-defined alphabets are generated based on certain criteria. For example, data may be mapped into symbols of a complex data stream as pairs of in-phase (I) and quadrature phase (Q) component values. I and Q component values of the complex data stream may then be used to modulate cosine and sine components of a quadrature oscillator that are subsequently upconverted to an RF carrier. Modulation formats such as quadrature amplitude modulation (QAM) and vestigial sideband amplitude modulation (VSB) are common formats used for transmission of digital television signals in accordance with, for example, the ATSC standard for digital television, "ATSC Digital Television Standard," Doc. A/53, September 1995.

The modulated carrier signal transmitted through the medium (e.g., wire, optical fiber, atmosphere, space, magnetic recording head/tape, etc.) comprises a series of analog pulses, each analog pulse being amplitude or phase modulated by a corresponding symbol in the sequence. The pulse shape used typically extends many symbol periods in time. This introduces the possibility of adjacent pulses corrupting each other, a phenomenon known as inter-symbol interference (ISI).

As is known in the art, transmit and receive filters may be selected to minimize the effects of ISI. A pulse shape is selected so as to provide i) a high amplitude signal at or near the sampling instant, ii) a rapid rate of decay past the sampling instant, iii) a zero-value at integer multiples of the baud rate, and iv) a realizable (or very closely approximate) implementation. Thus, the pulse shape is selected such that it obeys the well known "Nyquist pulse shaping criterion for zero ISI" as stated in condition (iii). As is known in the art, transmit and receive filters are usually selected so that when they are in cascade in the signal path a desired pulse shape is produced for a detector. For example, a commonly used filter that provides a "Nyquist pulse" may have its impulse response selected from the raised cosine family of functions. The transmit and receive filters are then selected as root-raised cosine filters. FIG. 1A shows a sequence of three raised cosine (Nyquist) pulses 101, 102, and 103, the first two instances corresponding to a bit value and the third instance corresponding to a complement bit value. The symbol repetition period, $T_s$, is the time between the largest, unity-valued peaks of two consecutive pulses in the sequence.

FIG. 1A shows three consecutive instances of a raised cosine pulse with ideal sampling (sampling period equals the symbol repetition period $T_s$ and phase $\tau=0$). In FIG. 1A, when the pulse is sampled at top-center of the unity-valued peaks, the amplitude measured at time equal 30 (arbitrary time base), is the sum of amplitudes of the three pulses, or a+b+c. Note that the contribution from adjacent pulses is zero (because b=c=0), so no ISI effect is introduced. In general, with ideal sampling, the signal contribution of other pulses is zero at non-zero, integer multiples of the symbol repetition period $T_s$. Ideal sampling of the sequence of pulses, therefore, results in zero ISI.

FIG. 1B shows these same three consecutive instances of a raised cosine pulse with one form of non-ideal sampling (e.g., sampling with period equal to symbol period $T_s$ and sampling phase $\tau \neq 0$). In FIG. 1B, when the pulse is sampled at time equal 28, the amplitude measured is again the sum of amplitudes of the three pulses, or a+b+c. However, unlike the sampling of FIG. 1A, the signal contribution of the other pulses, b and c, is now non-zero even though the sampling period is still $T_s$. This illustrates how non-ideal sampling introduces ISI effects.

Thus, it is desirable for a receiver to sample a received signal of consecutive pulses at nearly ideal sampling instances. When nearly ideal sampling is achieved, the signal is said to be sampled at "top dead center" of the symbol period, which also represents the "ideal sampling phase." Many factors combine to make this task difficult for a receiver, including the unknown propagation delay from the transmitter to the receiver, possible mismatch in the oscillator frequencies in the transmitter and receiver (causing the relative delay to drift over time), and multipath signal interference. For these reasons, a receiver both estimates and tracks the relative timing offset, which is referred to in the art as "timing recovery" and/or "symbol/baud synchronization."

A receiver performs several functions to demodulate and decode a received signal. Receiver functions include, for example, tuning and RF demodulation of the received signal to an intermediate frequency (IF) signal; synchronization of the carrier loop to the RF carrier; symbol timing recovery (baud synchronization); sampling according to the baud rate or symbol period; equalization; symbol detection; and decoding. After RF demodulation, the received signal is sampled by, for example, an analog-to-digital (A/D) converter. Timing recovery attempts to both detect the symbol repetition period $T_s$ and synchronize sampling instances to the top-dead-center of the pulse shapes. The timing recovery system then tracks variations in the detected period of $T_s$. A subsequent detector examines each sample to generate either a soft or hard decision for the symbol that corresponds to the sample. The present invention is concerned with the timing recovery function of the receiver.

Many methods exist in the art for timing recovery. One method uses a separate pilot tone in phase with the modulation process that is transmitted in addition to the information-bearing signal. The receiver derives the symbol timing information from the pilot tone. However, including a reference timing signal reduces channel throughput (and uses both extra power and bandwidth) for pilot tone transmission and reception. Consequently, many applications use blind techniques for symbol timing, and also equalization.

With blind techniques, timing information is derived directly from the received signal itself. An "error tracking synchronizer" continually estimates and tracks the timing error present, and adjusts a locally generated timing reference responsive to the error estimate. A "feedforward synchronizer" does not continually adjust a locally generated reference based on an error estimate, but instead processes the received signal to directly generate the reference. Feedforward synchronizers are often employed in burst-mode communication systems. In either error tracking or feedforward synchronizers, a "decision directed" synchronizer utilizes the receiver's estimates of the transmitted symbol values to synthesize the timing estimate. The synchronizer is termed a "non-data-aided" synchronizer, since no data is transmitted without user content to aid in timing recovery.

Synchronizers may operate in continuous time, discrete time, or a combination of both continuous and discrete time. Continuous time synchronizers apply the reference signal generated by the synchronizer to the clock of the A/D converter, thereby adjusting the actual sampling period of the analog input signal. Conversely, discrete time synchronizers leave the A/D converter in a "free-running" mode and apply the timing reference to a digital interpolator that adjusts the phase of the digital sample sequence.

FIG. 2 shows a block diagram of a prior art timing recovery system 200 that may be employed in a receiver. Timing recovery system 200 receives sample sequence y[n] from A/D converter 201 coupled to demodulator 222. A/D converter 201 is in "free-running" mode and is governed by a free running oscillator 202. The sample sequence y[n] is not synchronized to the symbol phase $\tau_s$ or period $T_s$. Timing recovery module 200 includes digital interpolator 203 that adjusts the phase $\tau$ and period T of the digital sample sequence to generate y[nT+$\tau$] (also labeled herein as $y_n(\tau)$). Interpolator 203 may be implemented with a poly-phase filter. The interpolated sequence $y_n(\tau)$ is in relatively close synchronization with the symbol period $T_s$ and phase $T_s$.

The interpolated sequence $y_n(\tau)$ is passed to timing phase detector 204. Timing phase detector 204 generates an estimate of the timing phase error (termed herein as "phase error" $e_\tau$) that represents the difference between the actual sampling phase $\tau$ and the ideal sampling phase $\tau_s$. The phase error $e_\tau$ is then filtered with loop filter 205 to reject high frequency components of the signal and integrate phase over time to adjust frequency. Local timing reference 206, shown in FIG. 3 as a numerically controlled counter (NCC), uses the filtered version of error estimate $e_\tau$ from loop filter 205 to adjust phase and/or period of the timing reference signal used to drive sampling of the signal. The reference of local timing reference 206 controls interpolator 203 in a way that tends to drive the phase error $e_\tau$ toward a fixed mean point, typically set as zero.

An alternative embodiment for a prior art timing recovery system 300 is shown in FIG. 3, in which the phase error $e_\tau$ is used to adjust the sampling clock on A/D converter 301 directly. The sampled sequence $y_n(\tau)$ is passed through timing phase detector 204 which generates an estimate of phase error $e_\tau$ in a manner similar to that of FIG. 2. The phase error $e_\tau$ is filtered with loop filter 205 and provided to local timing reference 306. Local timing reference 306, shown in FIG. 3 as voltage controlled oscillator (VCO), uses the filtered phase error $e_\tau$ from loop filter 205 to adjust phase and/or period of its output reference signal. The reference signal of local timing reference 306, in turn, controls A/D converter 301 in a way that tends to drive the phase error $e_\tau$ toward a fixed mean point, typically set as zero.

Many methods exist in the prior art that may be employed by timing phase detector 204 to calculate the error estimate $e_\tau$ from the sequence $y_n(\tau)$. One such technique defines a cost criterion (also referred to as a cost function) that is a function of the timing phase $\tau$. Timing phase $\tau$ is adjusted to a value that minimizes the cost function by a gradient descent technique. The value of $\tau$ which minimizes the cost function also causes the derivative of the cost function with respect to $\tau$ (also known as the "gradient function") to be zero. Thus, the desired timing phase may be found by adjusting, or stepping, the value of $\tau$ in a direction opposite to the sign of the cost function (i.e., mathematically, the trajectory of the parameter $\tau$ descends the steepest slope of the cost function). Therefore, this approach is sometimes termed a gradient descent strategy.

These prior art methods generally calculate the gradient of a mean squared error (MSE) function. The MSE cost function $J_{MSE}$ is defined as the expected value of the square of the difference between a received digital sample $y_n(\tau)$ and the actual transmitted symbol s as in equation (1):

$$J_{MSE}=E[|y_n(\tau)-s|^2] \qquad (1)$$

where E[●] denotes the mathematical expectation, or "expected value of" "●."

The derivative of $J_{MSE}$ with respect to $\tau$, $dJ_{MSE}/d\tau$, may be used as the phase error $e_\tau$, and may be written as in equation (2):

$$dJ_{MSE}/d\tau=(dJ_{MSE}/dy_n(\tau))dy_n(\tau)/d\tau \qquad (2)$$

where the first term on the right-hand side, $(dJ_{MSE}/dy_n(\tau))$, is the derivative of $J_{MSE}$ with respect to $y_n(\tau)$, which is proportional to $|y_n(\tau)-s|$. For typical implementations, the expectation operator is omitted and instantaneous values are used by the process instead. The derivative $dJ_{MSE}/dy_n(\tau)$ is the least mean square (LMS) error term and is defined as $e_{LMS}[n]$ in the timing phase detector error of equation (2'):

$$dJ_{MSE}/d\tau=e_{LMS}[n]\ dy_n(\tau)/d\tau. \qquad (2')$$

where $e_{LMS}[n]=|y_n(\tau)-s|$. Computation of $dy_n(\tau)/d\tau$ may be approximated using a finite impulse response (FIR) filter, such as described in Lee and Messerschmitt, *Digital Communication*, Appendix 17-B, Kluwer Academic Publishers, Norwell, Mass., Second Edition, 1994, which is incorporated herein by reference.

The error term $e_{LMS}[n]$ depends on the transmitted symbol value s. Actual symbol values may be available as an acquisition aid to the receiver during a training period. However, if either no training interval is defined in the system or the training period is insufficient for reliable acquisition, the receiver may use its estimates of the transmitted symbols instead (referred to as "decision directed" mode). These decision-directed systems are examples of blind signal systems, since they process a received signal without knowledge of the actual transmit symbol information. Under these conditions, before adequate convergence of the timing loop, the estimates of the transmitted symbols are prone to error, making decision directed adaptation unreliable. When the system has stabilized using some other acquisition method, the receiver then switches to the decision-directed gradient method for tracking.

Many blind techniques exist for timing recovery based on the demodulated signal. For example, some systems may use a timing phase detector which obtains a timing estimate from both high-pass and low-pass filtered versions of the demodulated signal. Such a system is disclosed in U.S. Pat. No. 5,872,815 to Strolle et al., entitled "Apparatus for Generating Timing Signals for a Digital Receiver," which is incorporated herein by reference.

A receiver also generally applies equalization to the sample sequence prior to forming hard decisions for symbols from the received sample sequence. Equalization is used to reduce the effects of ISI, caused by phenomena such as i) residual timing error (for example as in FIG. 1B), ii) multipath distortions from the propagation channel, and/or iii) approximations to the ideal transmit and receive filters for ease of implementation. As with timing recovery, the samples representing the received symbols are filtered by equalizer coefficients, which are adjusted to minimize a cost function.

One such blind cost criterion employed for equalization is the constant modulus (CM) criterion. The stochastic gradient descent of the CM criterion for equalization is known as the Constant Modulus Algorithm (CMA). The CMA algorithm is described in an article by D. N. Godard entitled "Self-Recovering Equalization in Two-Dimensional Data Communication Systems," *IEEE Transactions on Communications*, vol. 28, no. 11, pp. 1867–1875, October 1980, which is incorporated herein by reference. The CM criterion and CMA algorithm were further developed to de-couple equalization and carrier recovery functions in a receiver. Such use of CM criterion and CMA algorithm for equalization is described in J. R. Treichler et al., "A New Approach to Multipath Correction of Constant Modulus Signals," *IEEE Transactions on Acoustics, Speech, and Signal Processing*, vol. ASSP-31, no. 2, April 1993, which is incorporated herein by reference. Systems that use such CMA algorithm for adaptive equalization, such as that described in U.S. Pat. No. 5,872,815 to Strolle et al., do not employ the CM criterion or its variants for timing recovery.

SUMMARY OF THE INVENTION

The present invention relates to symbol timing recovery employing a blind cost criterion of Bussgang-class cost functions, such as the Constant Modulus (CM) criterion, and its derivative with respect to timing offset, in order to generate a timing phase error estimate. This estimate is then used to adjust the period and phase of the sample sequence toward the period and phase of the transmitted symbols, driving the timing phase error toward a point, such as zero in the mean. The sample values used may be either i) samples themselves, ii) processed (e.g., interpolated) samples, or iii) equalized and processed samples. In addition, timing phase error estimates for other cost criteria, including the least mean squares algorithm, may be generated. These timing phase error estimates are selected either alone or in combination for deriving the adjustment of the period and phase of the sample sequence. In addition, methods of blind timing recovery are described for VSB signals based on a single-axis CM (SA-CM) criterion which use real part extraction. Further, the present invention may be extended to jointly adjust timing phase and equalizer coefficients.

In accordance with an exemplary embodiment of the present invention, timing recovery of symbols in a received signal comprises (a) generating a sequence of samples from the received signal with a sample period and sample phase related to a symbol rate of the symbols; and (b) generating a phase error for a current sample from the sequence based on a gradient of a blind cost criterion of Bussgang-class cost functions. At least one of the sample period and sample phase are repetitively adjusted based on the phase error such that a magnitude of the phase error is driven to a predetermined point. Further embodiments calculate a blind cost error term based on the sample by forming an approximation of a derivative of the received signal with respect to the sampling phase; and combining the blind cost error term and the approximation to form the phase error.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1A:
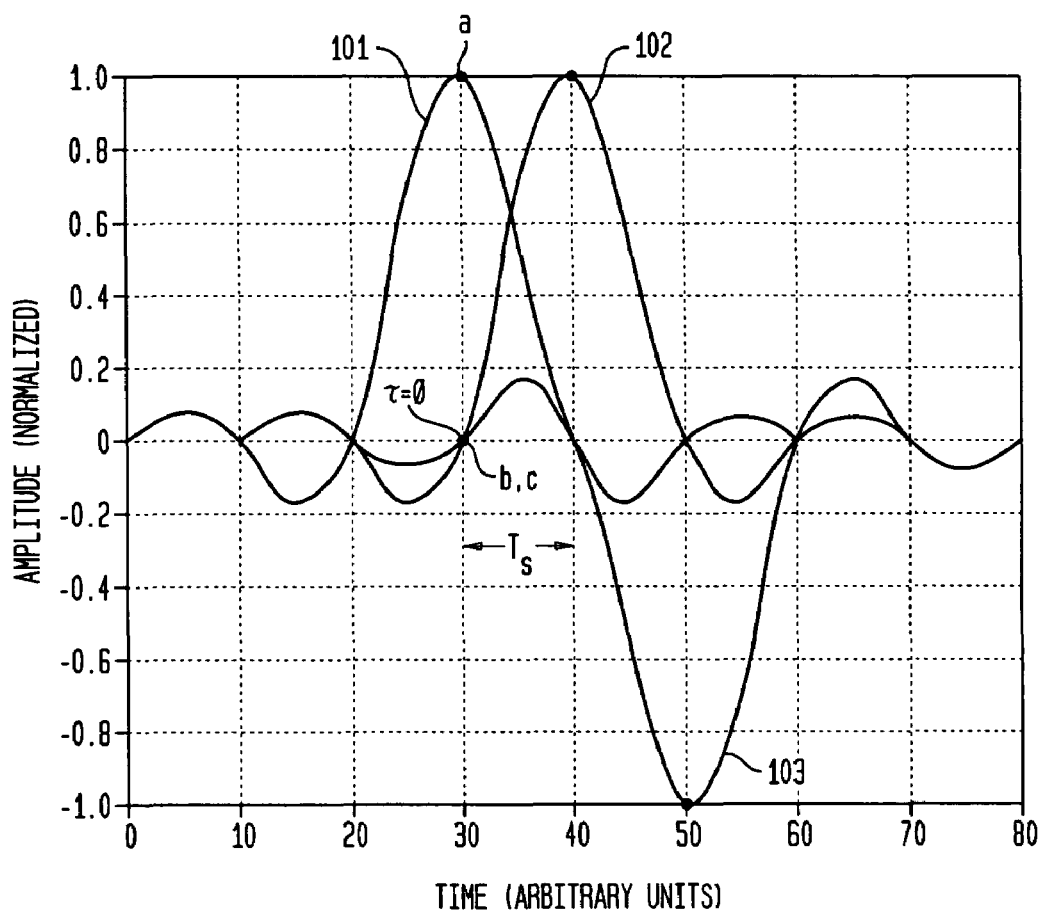
FIG. 1A shows three consecutive instances of a raised cosine pulse when ideal sampling is employed.
Figure 1B:
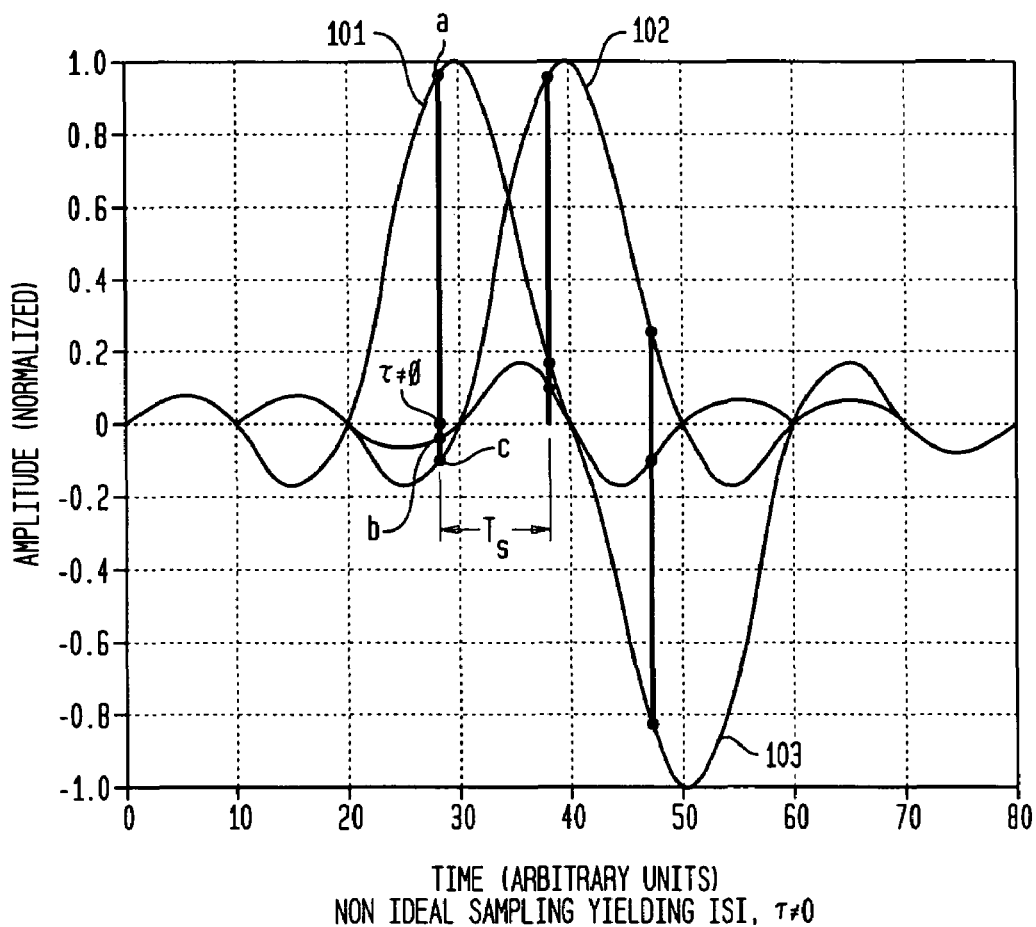
FIG. 1B shows three consecutive instances of a raised cosine pulse when non-ideal sampling is employed.
Figure 2:
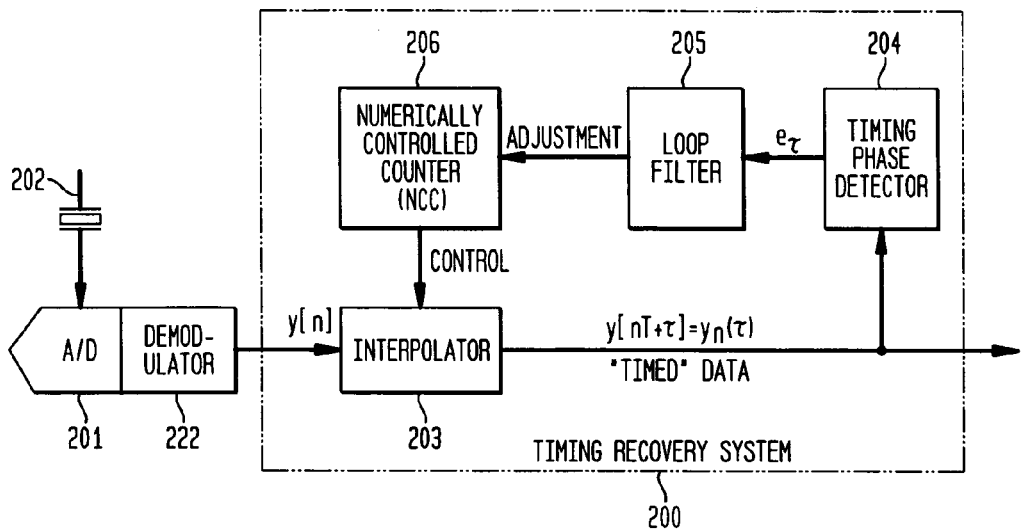
FIG. 2 shows a block diagram of a prior art timing recovery module.
Figure 3:
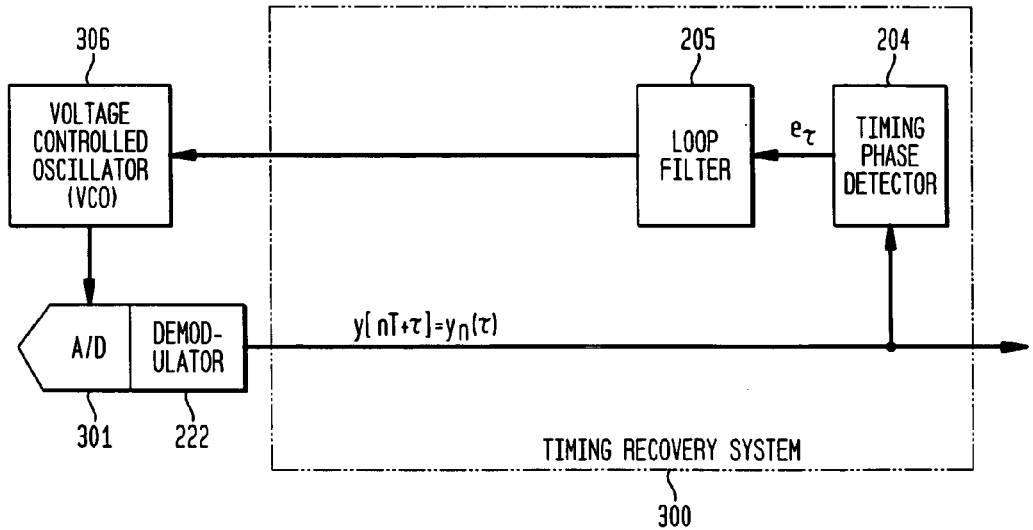
FIG. 3 shows a block diagram of an alternative prior art timing recovery module.
Figure 4:
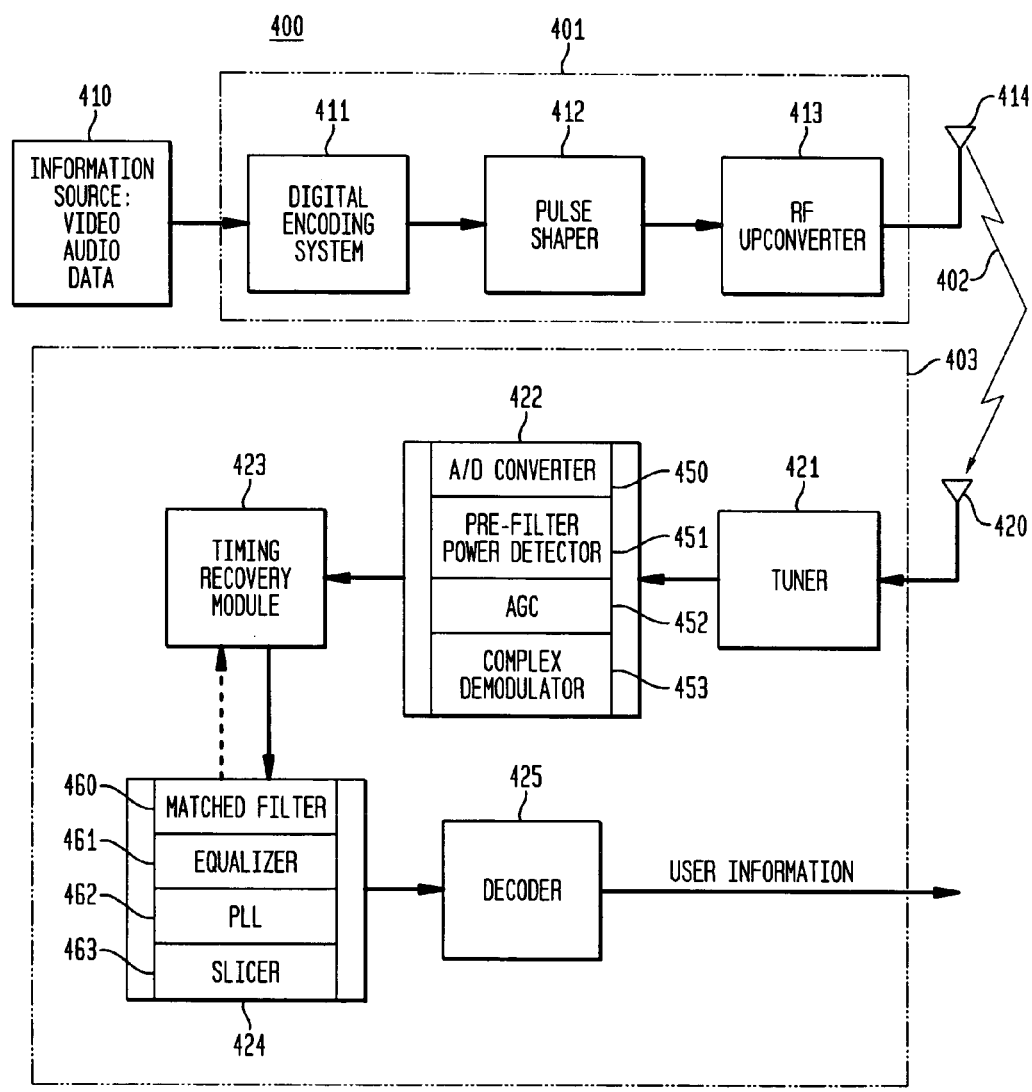
FIG. 4 shows a broadcast communication system including a receiver with symbol timing recovery in accordance with an exemplary embodiment of the present invention.

FIG. 4 shows a digital communication system 400 including receiver section 403 that employs symbol timing recovery and equalization in accordance with exemplary embodiments of the present invention. Communication system 400 comprises transmitter section 401 transferring signals through transmission medium 402 to receiver section 403. Digital communication system 400 may be employed to broadcast digital television signals in accordance with, for example, the ATSC standard for digital television, "ATSC Digital Television Standard," Doc. A/53, September 1995.

Transmitter section 401 comprises digital encoding system 411, pulse shaper 412, RF upconverter 413, and transmit antenna 414. Transmitter section 401 receives user data from information source 410 (such as video, audio, or computer files) coupled to digital encoding system 411. Digital encoding system 411 may provide analog-to-digital (A/D) conversion, error-correction encoding, and bit-to-symbol mapping to generate a sequence of symbols selected from a predetermined alphabet. For example, data may be mapped into a complex-valued signal stream with pairs of in-phase (I) and quadrature-phase (Q) components. Digital encoding system 411 provides the symbols to pulse shaper 412. Pulse shaper 412, which may be implemented with a shaping filter, provides pulse shaping of the symbols. The signal generated by pulse shaper 412 is provided to RF upconverter 413 that i) uses the signal to modulate a radio frequency (RF) carrier and ii) amplifies the signal.

Various modulation techniques, such as quadrature amplitude modulation (QAM), m-ary phase-shift keyed modulation (m-ary PSK), or vestigial sideband modulation (VSB) known in the art of digital television may be employed to modulate the carrier. Other modulation techniques include m-ary offset QAM, modulation in accordance with the CCITT 802.11 standard, and V.27 modulation. For example, a quadrature oscillator may be employed as an RF modulator and use i) the I signal component to modulate the cosine component generated by the oscillator and ii) the Q signal component to modulate the sine component of the oscillator. The modulated and amplified RF carrier is then emitted into the transmission medium 402 as an RF signal via transmit antenna 414.

Receiver section 403 comprises receive antenna 420, tuner 421, demodulator 422, timing recover module 423, detector 424, and decoder 425. Antenna 420 receives the RF signal from the transmission medium 402. The received RF signal may have added phase and amplitude noise, doppler shift, multipath effects, distortion, dispersion, and/or other effects typically associated with the particular transmission medium.

Tuner 421 isolates the RF signal of interest received through antenna 420 from medium 402 and translates the signal, in frequency, to an intermediary frequency (IF) signal ("passband signal"). Many different techniques exist in the art for demodulating a modulated RF carrier to provide a near-baseband or passband signal, and some of these systems may not necessarily employ digital signal processing techniques. One skilled in the art would realize that the process of receiving, isolating, and demodulating the transmitted signal as described herein is described as an aide to the description of symbol timing recovery and synchronization in accordance with exemplary embodiments of the present invention.

Demodulator 422 processes the passband signal as follows. The received signal is sampled via an analog-to-digital (A/D) converter 450, creating a digital sample sequence. A/D converter 450 may generate sample values at a rate greater than the symbol rate $T_s$. As would be apparent to one skilled in the art, decimation and/or interpolation may be employed at various points within receiver section 403 to generate sample sequences at different sampling rates and different sampling phases. Demodulator 422 may apply pre-filter/power detector 451 to the digital sample sequence to reduce noise effects and to generate a power level estimate for automatic gain control (AGC). Gain of the near-baseband signal is adjusted via an automatic gain control (AGC) circuit 452. Gain of the IF signal, and/or RF signal may also be controlled via AGC circuits implemented similarly to that of AGC circuit 452. AGC circuit 452 controls dynamic range of the near-baseband signal to within a predetermined range. Complex demodulator 453 generates the near-baseband signal from the passband signal, and splits the near-baseband signal into a complex sample sequence of in-phase (I) and quadrature-phase (Q) components. The near-baseband signal is not at precise baseband due to clock inaccuracies, oscillator phase noise, or doppler shift.

FIG. 4 and subsequent figures show the signal path of I and Q components (and processing) as a single line, though they may be conveyed and/or processed through separate paths. In general, signals processed by receiver section 403 are complex-valued, though for some applications only I components are used. For example, with VSB signaling, the Q component is the Hilbert transform of the I component and thus contains no additional user information. In addition, while the figures illustrate symbol timing recovery in a digital television receiver, many components in addition to those shown may exist, but these additional components are not necessary to understanding the present invention and are omitted for simplicity.

Timing recovery module 423 detects and generates an estimate of timing phase error $e_\tau$. Phase error $e_\tau$ is derived from the derivative of a blind cost criterion in accordance with present invention. Timing recovery module 423 aligns or otherwise synchronizes i) the period T and phase $\tau$ for sampling of the received signal to ii) the symbol period (baud rate) $T_s$ and phase $\tau_s$ of I and Q signal components of the transmitted signal. Timing recovery module 423 controls the period T and phase $\tau$ of the sample sequence such that the phase error $e_\tau$ is driven toward a desired point. For example, the phase error $e_\tau$ is driven in mean toward zero. One skilled in the art would realize that such control may drive toward a non-zero point, and may be driven in mean, or similar type of measure. Timing recovery module 423 thus allows for generating a sequence of samples from the received analog signal for which sampling occurs at the symbol period and at the peak/center of the pulse representing each symbol.

The sequence of samples is then provided to detector 424, which generates an estimate for each sample corresponding to a transmitted symbol. Detector 424 filters the signal with matched filter 460 whose frequency response characteristic matches the frequency response of pulse shaper 412. For example, if the pulse shaper applies a filter corresponding to a root-raised cosine function, the matched filter also applies a root-raised cosine to i) create a Nyquist pulse at the matched filter output and ii) maximize signal-to-noise ratio (SNR).

Since transmission medium 402 may distort the signal waveform passing through it, each sample from the timing recovery module may include ISI effects from adjacent samples, even though the sample values are generated at instances corresponding to the correct symbol period. Equalizer 461 of detector 424 applies equalization to the sequence of samples from timing recovery module 423. Equalizer 461 adjusts the sample values to remove distortion effects and restore the "zero ISI" characteristics of the sample sequence. Equalizer 461 may be implemented with an adaptive, multi-tap filter in a linear or non-linear architecture with a finite or infinite impulse response. Detector 424 may also include a phase-locked loop (PLL) 462 for residual carrier loop recovery and synchronization. Carrier loop recovery and synchronization translates the signal to precise baseband by compensating for a residual offset between the carrier frequency of the transmitted signal and the frequency selected by tuner 421. While shown as part of detector 424, either detector 424 or decoder 425 may employ, for example, slicer 463 to generate a hard decision for each symbol from the corresponding sample.

Decoder 425 processes the sequence of symbol decisions to reverse the various levels of encoding (symbol-to-data mapping, error correction, re-formatting, and/or depacketizing) to reconstruct the original user information. For example, decoder 425 may include a QAM or VSB decoder, as well as Reed-Soloman error correction to drive the probability of error below a predetermined threshold. Reformatting may include decoding in accordance with a digital television standard (e.g., MPEG-1, MPEG-2).

In accordance with exemplary embodiments of the present invention described herein, symbol timing recovery employs the Constant Modulus (CM) criterion and its stochastic gradient descent, termed the CM algorithm (CMA), to generate the phase error $e_\tau$ using blind adaptation. This timing phase error estimate is used to control the frequency (period) and phase of the sample sequence either by 1) adjusting the sample clock in the A/D converter, or 2) interpolating the digital sample sequence such that the phase error $e_\tau$ is driven toward zero. While the preferred embodiments of the present invention are described herein with respect to the CM criterion and the CMA algorithm, one skilled in the art would realize that the present invention is not so limited. Other blind cost criteria of Bussgang-class cost functions may be used that are related to the CM criterion and CMA algorithm described herein. The Bussgang-class of functions are well-known in the are and are described in, for example, Simon Haykin, *Blind Deconvolution*, Chapter 2, PTR Prentice-Hall, Englewood Cliffs, N.J. (1994), whose teachings are incorporated herein by reference.

Figure 5A:
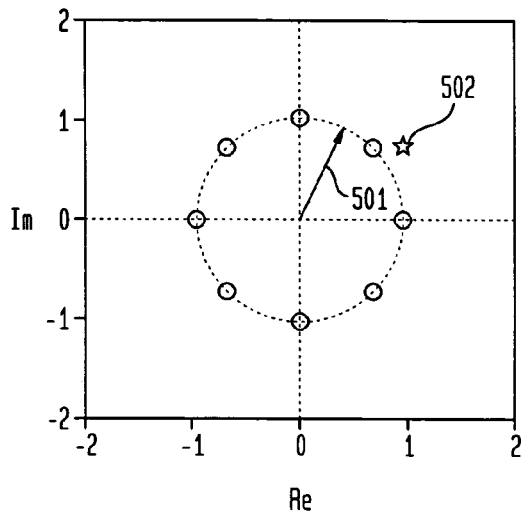
FIG. 5A illustrates a constant modulus criterion based on determining a radius about the origin of an 8-PSK source constellation.
Figure 5B:
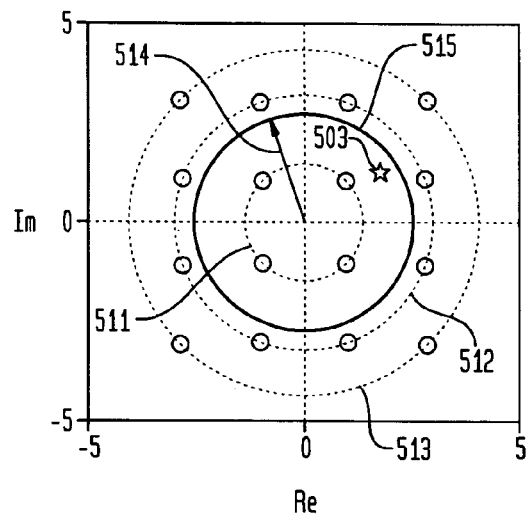
FIG. 5B illustrates a constant modulus criterion based on determining a radius about the origin of a 16-QAM source constellation.

The CM criterion penalizes the deviation of the dispersion of the magnitude squared of the received signal from a pre-calculated constant referred to as the "dispersion constant" or the "Godard radius." FIGS. 5A and 5B illustrate that the constant modulus criterion is based on deviation from a "radius" about the origin of, for example, a source constellation.

FIG. 5A shows a radius 501 of an 8-PSK (phase-shift keyed) constellation plotted for real (e.g., Re or I) and imaginary (e.g., Im or Q) components. In FIG. 5A, each point (symbol) lies on the circle defined by this radius (termed a constant modulus system), and the CM criterion penalizes distance of a received symbol (e.g., symbol 502) from this circle. Even though the constellation may rotate, the constellation remains on the circle, and so applying a CM criterion to this constellation does not penalize spatial rotation of the constellation due to residual carrier offset. FIG. 5B shows a 16-QAM (quadrature amplitude modulation) constellation plotted for real and imaginary components. In FIG. 5B, groups of points (symbols) lie on corresponding concentric circles 511, 512, and 513. The CM criterion determines a radius 514 of circle 515, which is not necessarily a radius of one of the concentric circles 511, 512, and 513 (termed non-constant modulus), as a "common" radial distance from the origin for the points of the constellation. As with the constellation of FIG. 5A, the CM criterion penalizes distance of a received symbol (e.g., symbol 503) from this circle 515.

The CM criterion defines a cost function $J_{CM}$ that may be expressed as given in equation (3):

$$J_{CM}=E[(\rho^2-|y_n(\tau)|^2)^2] \quad (3)$$

where $\rho^2$ is the dispersion constant (Godard radius), $y_n(\tau)$ is the discrete value that represents the sampled signal (e.g., the sampled symbol), and $\tau$ represents the timing (sampling) phase. The dispersion constant $\rho^2$ is a quantity that can be determined from the type of modulation employed (e.g., QAM, BPSK, etc.). The dispersion constant $\rho^2$ may be derived by calculation, experiment, or a combination of both for a particular implementation. Note that if $y_n$ is real-valued, then the modulus operator in equation (3) can be omitted.

The derivative of $J_{CM}$ with respect to $\tau$ may be expressed as in equation (4):

$$dJ_{CM}/d\tau=(dJ_{CM}/dy_n(\tau))dy_n(\tau)/d\tau. \quad (4)$$

The derivative of $J_{CM}$ with respect to $y_n(\tau)$ is proportional to that given by (5):

$$dJ_{CM}/dy_n(\tau)=E[y_n(\tau)(\rho^2-|y_n(\tau)|^2)]. \quad (5)$$

The phase error $e_\tau$ is formed by removing the expectation operator and combining (4) and (5)

$$e_\tau=dJ_{CM}/d\tau=e_{CMA}[n]\ dy_n(\tau)/d\tau \quad (4')$$

where $e_{CMA}[n]=y_n(\tau)(\rho^2-|y_n(\tau)|^2)$.

In equations (4), (4'), and (5), $y_n(\tau)$ represents the discrete value for the sampled signal, and the sequence discrete values may have various levels of pre-processing applied. Thus, $y_n(\tau)$ may either be the original sample sequence, interpolated data from the original sample sequence, or the equalized sample sequence (either original or interpolated). Note that if $y_n(\tau)$ is taken as the equalizer output sample, then $e_{CMA}[n]$ is the CMA error term that is used to update the equalizer coefficients. The CMA error term used to update the equalizer coefficients may be as shown by D. N. Godard in, "Self-Recovering Equalization in Two-Dimensional Data Communication Systems," *IEEE Transactions on Communications*, vol. 28, no. 11, pp. 1867–1875, October 1980, and J. R. Treichler et. al. in, "A New Approach to Multipath Correction of Constant Modulus Signals," *IEEE Transactions on Acoustics, Speech, and Signal Processing*, vol. ASSP-31, no. 2, April 1993.

One skilled in the art would understand that the equations described herein, such as equations (3) through (5), may include scaling, change of sign, or similar constant linear modifications that are not shown for simplicity. One skilled in the art would realize that such modifications are readily determined or derived for the particular implementation. Thus, each of the described equations may be subject to such modifications, and are not limited to the exact forms presented herein.

Figure 6:
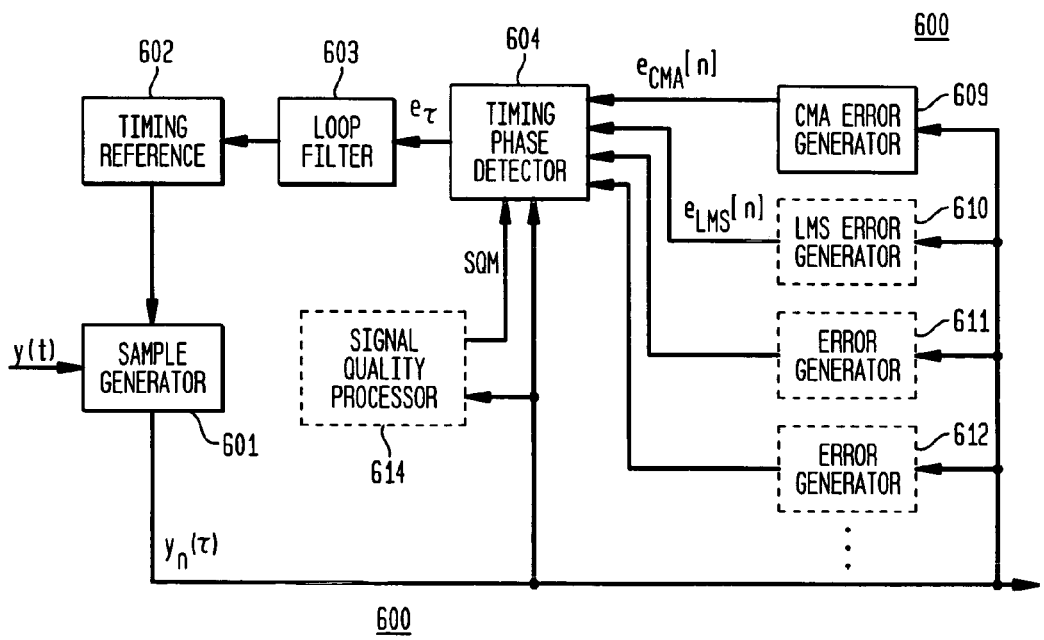
FIG. 6 shows an exemplary embodiment of a timing recovery system in accordance with the present invention.

FIG. 6 shows an exemplary embodiment of timing recovery system 600 in accordance with the present invention. As shown in FIG. 6, sample generator 601 generates a sequence of samples y(nT+τ) (equivalently, $y_n(\tau)$) of the received signal y(t), where T is the sampling period and τ is the relative timing phase for generating the samples. Sample generator 601 generates samples $y_n(\tau)$ having period T and phase τ set based on a timing control signal from timing reference 602. Sample generator 601 may be an A/D converter with sampling controlled with the reference from timing reference 602. Alternatively, sample generator 601 may be a free-running A/D converter sampling at a pre-set rate, followed by an interpolator that is controlled by timing reference 602 implemented with, for example, a numerically-controlled counter.

CMA error generator 609 generates an estimate of the CMA phase error $e_{CMA}[n]$ from the sample sequence $y_n(\tau)$ using, for example, equation (5). Timing phase detector 604 determines the relative timing phase τ of the sample sequence $y_n(\tau)$ and receives CMA phase error $e_{CMA}[n]$ from CMA error generator 609. Timing phase detector 604 computes the approximate derivative of $y_n(\tau)$ with respect to τ, $dy_n(\tau)/d\tau$, and multiplies the result by the CM phase error term $e_{CMA}[n]$ to generate the approximate phase error $e_\tau$ (for example, as in equation (4')). Computation of $dy_n(\tau)/d\tau$ may be approximated using a finite impulse response (FIR) filter, such as described in Lee and Messerschmitt, *Digital Communication*, Appendix 17-B, Kluwer Academic Publishers, Norwell, Mass., Second Edition, 1994, which is incorporated herein by reference. Timing phase detector 604 provides the phase error $e_\tau$ (representing the CMA-weighted timing phase error) to loop filter 603 which removes high-frequency signal components and integrates the phase error over time to adjust the frequency of timing reference 602, and thus ultimately sample generator 601.

Optionally, timing recovery system 600 shown in FIG. 6 may calculate one or more additional approximations of phase error in accordance with other cost criteria, such as the mean squared error (MSE) and its derivative shown in equation (2). In particular, the cost-based error term, such as the error term $e_{LMS}[n]$ in equation (2'), may be calculated concurrently with the CMA error term $e_{CMA}[n]$. Signal quality may be measured and evaluated with a set of decision rules. In accordance with the decision rules, the receiver may switch between the different cost criteria to generate the timing phase error. For example, blind adaptation in accordance with phase error $e_\tau$ calculated with $e_{CMA}[n]$ may be used when the receiver has a relatively low level of confidence in estimates for transmitted symbols. The receiver may then switch to a phase error $e_\tau$ calculated with $e_{LMS}[n]$ or a decision-directed version when the confidence level in estimates for transmitted symbols exceeds a certain threshold.

The least mean squares (LMS) algorithm, and specifically the decision-directed LMS algorithm, is a well-known adaptive algorithm. The LMS algorithm may generally be implemented with occasional or periodic training sequences or tones ("training") to form the phase error term $e_{LMS}[n]$. However, embodiments of the present invention may employ a blind steering mechanism whereby training may be replaced with "best estimates" of transmitted symbols. Such techniques for decision-directed LMS are described in R. W. Lucky, "Techniques for Adaptive Equalization of Digital Communication Systems," *Bell Systems Technical Journal*, vol. 45, no. 2, pp. 255–286, February 1966, which is incorporated herein by reference.

As shown in FIG. 6, timing recovery system 600 may include cost-based error generators 609–612, and signal quality processor 614. Each of the cost-based error generators 609–612 determines a corresponding cost-based error term. For example, cost-based error generator 610 may employ the LMS error term $e_{LMS}[n]$, possibly operating in a decision-directed mode. Cost-based error generators 611–612 may generate error terms in accordance with other methods, such as by band-edge recovery as described subsequently. Signal quality processor 614 may monitor the received signal quality to determine if estimates of the symbol value are relatively accurate, based on some predetermined threshold. Signal quality processor 614 may thus generate a signal quality measure (SQM) that is provided to timing phase detector 604. Using SQM, timing phase detector 604 selects one or more of the cost-based timing errors (e.g., $e_{CMA}[n]$ or $e_{LMS}[n]$). The selected cost-based timing errors may then be used alone or in combination by timing phase detector 604 to generate the phase error $e_\tau$.

Signal quality measured by signal quality processor 614 may include: 1) signal-to-noise ratio (SNR) for the signal output from equalizer 461 (FIG. 4); and 2) SNR for the signal from, for example, a trellis decoder of detector 424 or decoder 425. In addition, signal quality processor 614 may use criteria for symbol-by-symbol switching between CMA and LMS update modes for an adaptive equalizer, such as those described in a U.S. patent application Ser. No. 09/549,368, entitled "A Hybrid Soft and Hard Decision Feedback Equalizer," filed on Apr. 14, 2000. Signal quality processor 614 may also use a prescribed number of symbol intervals between signal (timing) acquisition and the beginning of symbol processing. Signal quality processor 614 may use these factors alone or in combination to generate SQM.

As would be apparent to one skilled in the art, many different implementations of the present invention are possible depending on the particular receiver design. Factors such as carrier-to-baseband demodulation, sampling rate, samples used for timing recovery (e.g., input samples, interpolated input samples, or equalized samples), and noise rejection processing may combine to distribute the various functions detailed in FIG. 6 throughout the signal processing path. For example, comparing FIG. 4 and FIG. 6, the timing recovery system 600 may be embodied in timing recovery module 423, A/D converter 450 (in demodulator 422), and equalizer 461 (in detector 424). The following describes exemplary implementations for the preferred embodiment shown in FIG. 6.

Equalization and timing synchronization operations may be performed in parallel by jointly minimizing a blind cost function. For example, if $y_n(\tau)$ is defined as the equalizer output sample, then the CMA error term that is used to update the equalizer coefficients is given as before in equation (5), or $e_{CMA}[k]=y(k)(\rho^2-|y(k)|^2)$, with $k=(nT+\tau)$. This same error term, already calculated in the adaptive equalizer, may be used to form the timing phase error by combining the error term with an approximation to the derivative of $y_n(\tau)$ with respect to $\tau$. This error term may be included within a feedback signal shown in FIG. 4 as a dashed line signal path from detector 424 to timing recovery module 423.

Error term $e_{CMA}[k]$ used to compute equalizer tap coefficients is also a function of $\tau$ when $k=(nT+\tau)$. Since the equalizer, as part of its normal operation, computes $e_{CMA}[k]$, the value for $e_{CMA}[k]$ computed by the equalizer is passed to the timing phase detector 604 (FIG. 6) as $e_{CMA}[n]$. In practice, alignment of samples with the value for $e_{CMA}[k]$ computed by the equalizer may be employed to account for processing delay through the equalizer. Many implementations of adaptive equalizers calculate $dJ_{CM}/dy_n(\tau)$ in order to properly adapt the equalizer coefficients, as is described in Treichler et. al., "Practical Blind Demodulators for High-Order QAM Signals," *Proceedings of the IEEE*, vol. 86, no. 10, pp. 1907–1926, October 1998, which is incorporated herein by reference.

Figure 7:
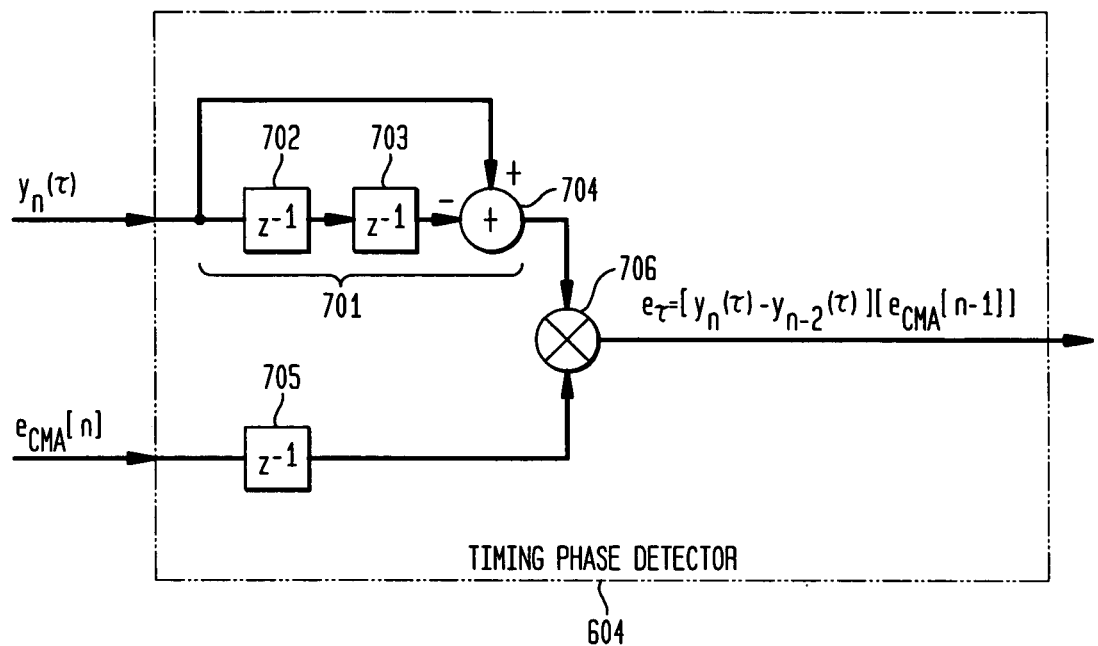
FIG. 7 shows a first exemplary implementation of the timing phase detector of FIG. 6.

A first exemplary implementation for timing phase detector 604 is shown in FIG. 7. Timing phase detector 604 receives $y_n(\tau)$ from sample generator 601 (or from an equalizer output) and $e_{CMA}[n]$ from, for example, an adaptive equalizer. The top branch 701 calculates an approximation of $dy_n(\tau)/d\tau$. Since the calculation of $dy_n(\tau)/d\tau$ is a non-causal algorithm, delay slots 702 and 703 are employed to generate a two-symbol-delayed version of $y_n(\tau)$, $y_{n-2}(\tau)$. The difference between the current signal sample, $y_n(\tau)$, and the two-symbol-delayed version, $y_{n-2}(\tau)$, is generated at combiner 704. Delay 705 provides a one-symbol-delayed version of $e_{CMA}[n]$, $e_{CMA}[n-1]$, that is multiplied at multiplier 706 by the difference between the current signal sample, $y_n(\tau)$, and the two-symbol-delayed version, $y_{-2}(\tau)$. The result from multiplier 706 is the phase error $e_\tau$ that is passed to loop filter 603.

Figure 8:
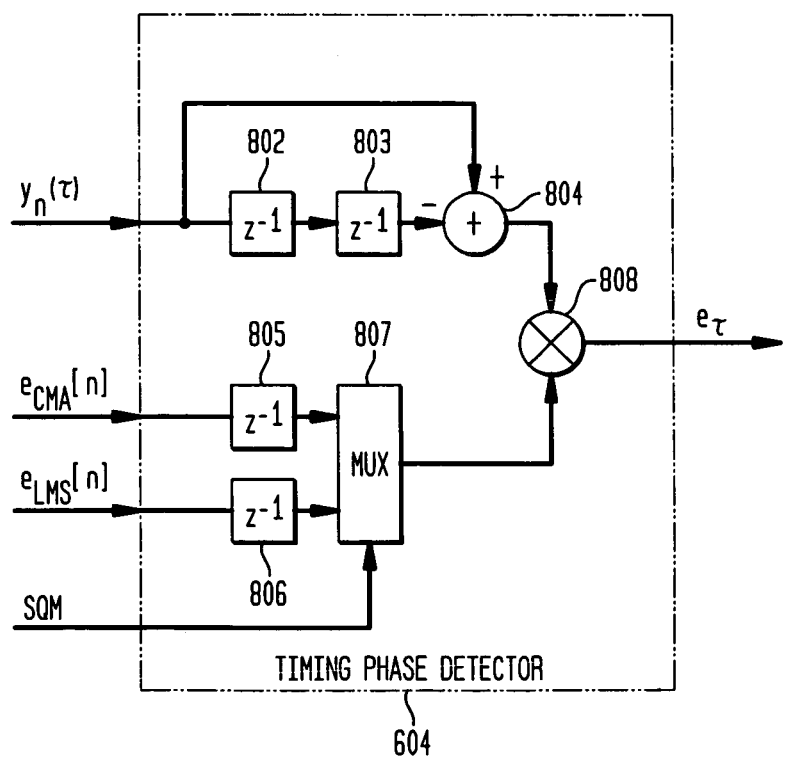
FIG. 8 shows a second exemplary implementation of the timing phase detector of FIG. 6.

A second exemplary implementation for timing phase detector 604 is shown in FIG. 8. The second exemplary implementation receives both error terms $e_{CMA}[n]$ and $e_{LMS}$

[n] from, for example, an adaptive equalizer, and selects one of the error terms to calculate $e_\tau$. Delay slots 802 and 803 generate the two-symbol-delayed version, $y_{n-2}(\tau)$. Approximation of $dy_n(\tau)/d\tau$ occurs at combiner 804 generating the difference between the current signal sample, $y_n(\tau)$, and the two-symbol-delayed version, $y_{n-2}(\tau)$. Delay 805 provides $e_{CMA}[n-1]$, and delay 806 provides $e_{LMS}[n-1]$. Signal SQM is applied to multiplexer 807 to select either $e_{CMA}[n-1]$ or $e_{LMS}[n-1]$ as its output to multiplier 808. Multiplier 808 combines i) the output of multiplexer 807 (either $e_{CMA}[n-1]$ or $e_{LMS}[n-1]$) with ii) the approximation of $dy_n(\tau)/d\tau$ from combiner 804. The result from multiplier 808 is the phase error $e_\tau$ that is passed to loop filter 603. Signal SQM may be updated every symbol, or over a block of symbols, and the decision of which error term ($e_{CMA}[n-1]$ or $e_{LMS}[n-1]$) selected with SQM is determined on a symbol-by-symbol basis.

The first and second exemplary implementations previously described with respect to FIGS. 7 and 8 calculate an approximation to the derivative of the CM cost function for the timing phase error $e_\tau$. Other decision-directed timing methods are known in the art. One such method is described in Mueller and Muller, *Timing Recovery in Digital Synchronous Data Receivers*, IEEE Transactions On Communications, vol. COM-24, no. 5, May 1976, which is incorporated herein by reference. In this method of Mueller et al., a class of phase error functions is presented. The example of phase error function most commonly in use is the timing phase detector function given in equation (7):

$$e_\tau = y_n(\tau)s_{n-1} - y_{n-1}(\tau)s_n \qquad (7)$$

The inventors have adapted the methods of Mueller et al. to make use of the CM criterion. Equation (7) may be rewritten as in equation (7'):

$$e_\tau = e_{LMS}[n]y_{n-1}(\tau) - e_{LMS}[n-1]y_n(\tau). \qquad (7')$$

Substituting the error term $e_{CMA}$ for the error term $e_{LMS}$ in equation (7'), yields a CM cost weighted calculation for $e_\tau$ as in equation (8):

$$e_\tau = e_{CMA}[n]y_{n-1}(\tau) - e_{CMA}[n-1]y_n(\tau) \qquad (8)$$

A similar substitution of $e_{CMA}$ for $e_{LMS}$ may be done for other phase detector functions of Mueller and Muller.

Figure 9:
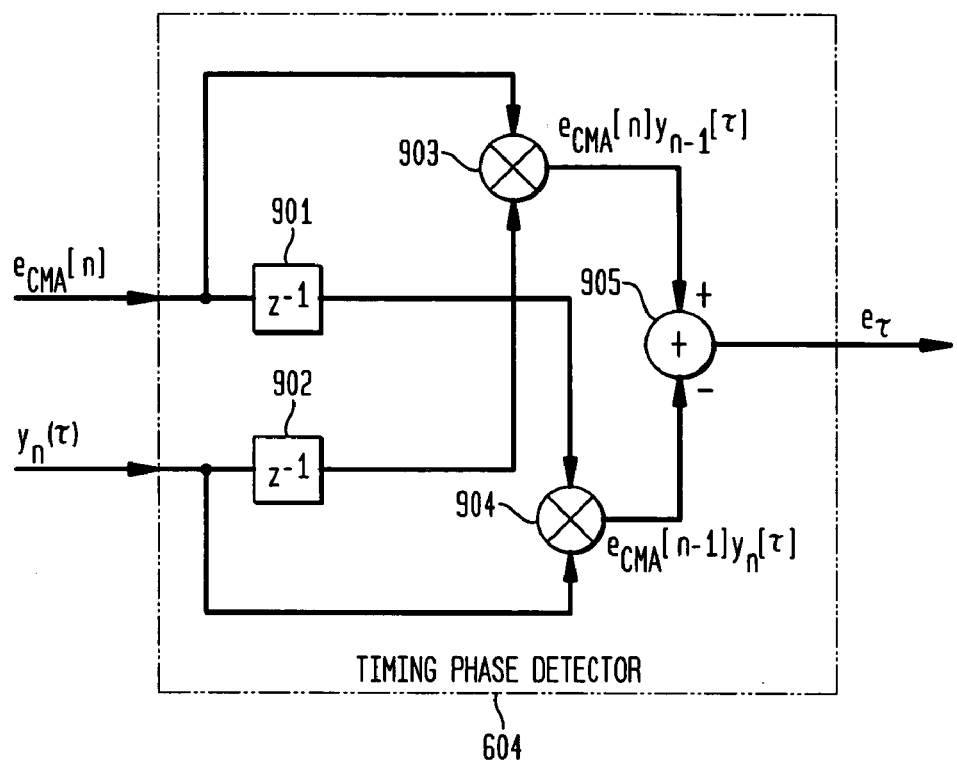
FIG. 9 shows a third exemplary implementation of the timing phase detector of FIG. 6.

FIG. 9 shows a third exemplary implementation for timing phase detector 604 implementing the calculation for $e_\tau$ using the CMA error term $e_{CMA}[n]$ as in equation (8). Both $y_n(\tau)$ and $e_{CMA}[n]$ are delayed by one sample in corresponding delays 901 and 902. Multiplier 903 receives $e_{CMA}[n]$ and $y_{n-1}(\tau)$ and generates $e_{CMA}[n]y_{n-1}(\tau)$. Multiplier 904 receives $e_{CMA}[n-1]$ and $y_n(\tau)$ and generates $e_{CMA}[n-1]y_n(\tau)$. Combiner 905 generates the difference between the outputs of multipliers 903 and 904 to calculate $e_\tau$ as given in equation (8).

Figure 10:
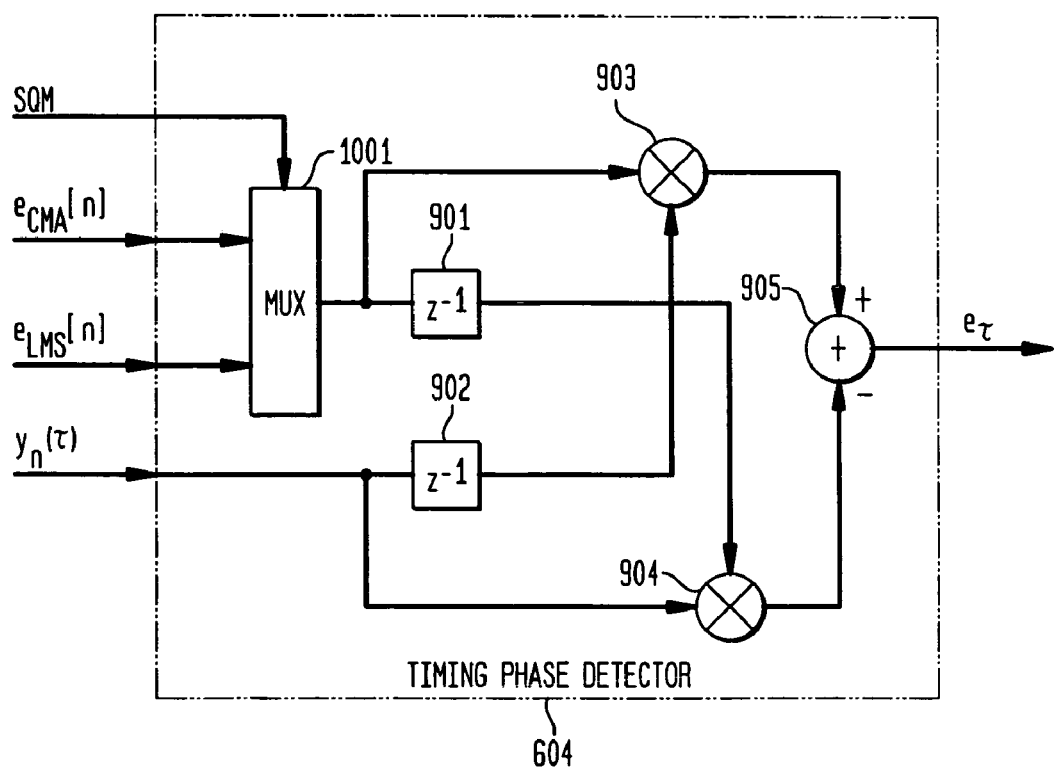
FIG. 10 shows a fourth exemplary implementation of the timing phase detector of FIG. 6.

FIG. 10 shows a fourth exemplary implementation for timing phase detector 604 that employs the signal SQM to select either i) $e_{CMA}[n]$ to calculate $e_\tau$ as given in equation (8) or ii) $e_{LMS}[n]$ to calculate $e_\tau$ as given in equation (7'). This fourth exemplary implementation is similar to that shown in FIG. 9, but includes a multiplexer 1001 that selects either $e_{CMA}[n]$ or $e_{LMS}[n]$ via signal SQM. Timing phase detector 604 may select either $e_{CMA}[n]$ or $e_{LMS}[n]$ on a symbol-by-symbol basis.

As would be apparent to one skilled in the art, the first through fourth exemplary implementations may be combined in various ways, with several different blind cost weighted error term calculations performed. For these different combinations, the particular calculation for error term $e_\tau$ that is actually provided to the loop filter is determined via signal SQM.

Figure 11:
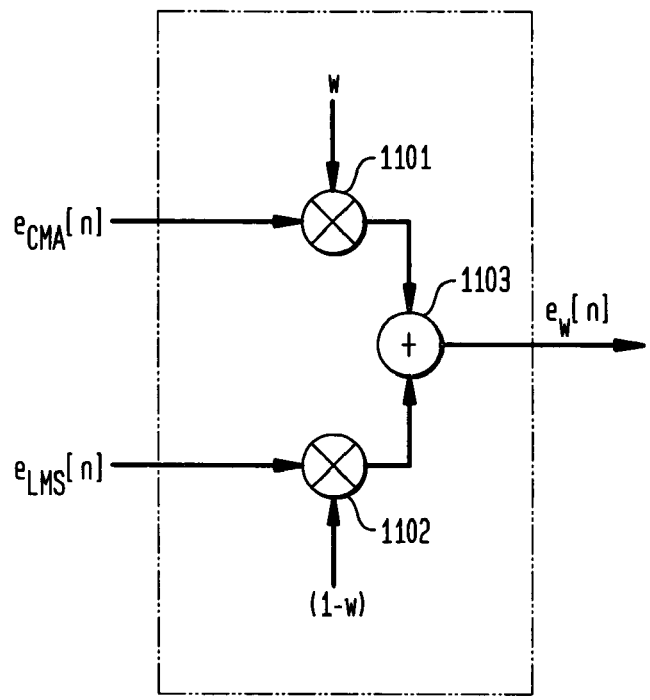
FIG. 11 shows a weighted averaging circuit that may be substituted for the multiplexer in FIGS. 8 and 10.

In addition, the second and fourth exemplary embodiments may be modified from using $e_{CMA}[n]$ and $e_{LMS}[n]$ independently to using a weighted combination of $e_{CMA}[n]$ and $e_{LMS}[n]$. For example a linear combination of $e_{CMA}[n]$ and $e_{LMS}[n]$ may be employed to calculate phase error $e_\tau$. Each of the multiplexers 807 and 1001 shown in FIG. 8 or 10, respectively, may be replaced with weighted averaging mechanism 1100 shown in FIG. 11. A weighting constant, w, is determined by, for example, signal quality processor 614 (FIG. 6). As shown in FIG. 11, $e_{CMA}[n]$ is weighted by w in multiplier 1101 and $e_{LMS}[n]$ is weighted by (1−w) in multiplier 1102. The output values of multipliers 1101 and 1102 are added in combiner 1103 to generate a weighted phase error term $e_w[n]$. For FIG. 11, the weighting constant w may be implemented as a value that is greater than or equal to zero and less than or equal to one. If the value of w is set equal to zero or one, the operation of weighted averaging mechanism 1100 is equivalent to the operation multiplexers 807 and 1001. One skilled in the art may extend the circuit of FIG. 11 to other weighting mechanisms.

The embodiments of the present invention are described having nearly instantaneous values of error terms, or combinations of error terms. One skilled in the art would recognize that an instantaneous error term may be replaced by a filtered version of the error term, where the filtered version is generated with a filter having memory. For example, an average of past error terms may be combined with an approximate derivative to form a timing phase error signal. This filtering may also include a weighted linear combination of error terms from different sampling instances.

Figure 13:
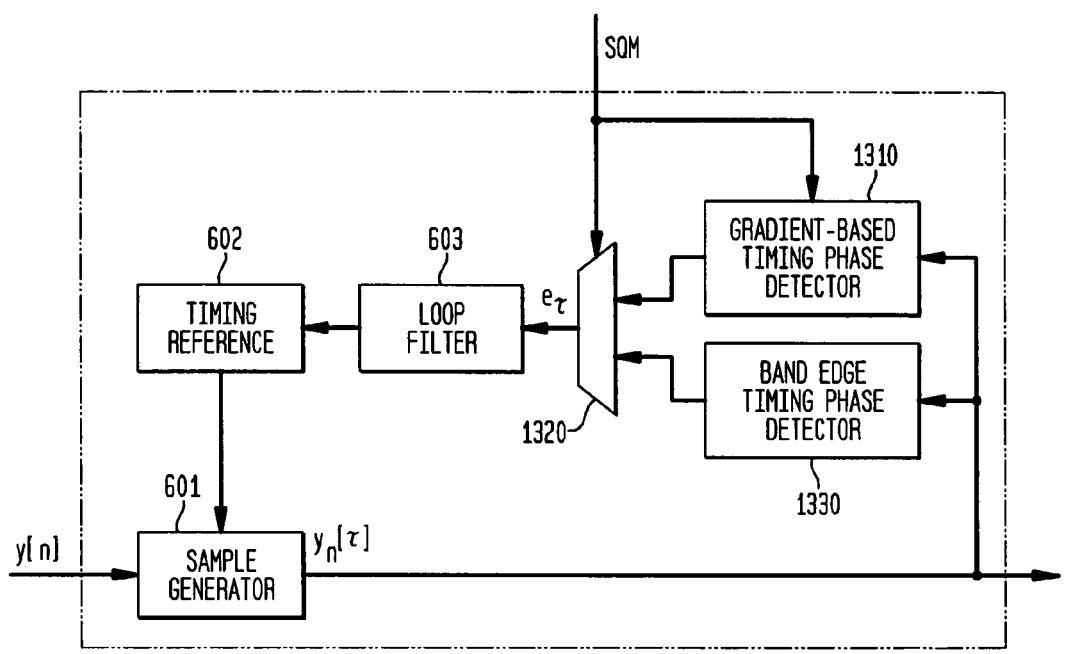
FIG. 13 shows a fifth exemplary implementation of the timing phase detector of FIG. 6 switching between gradient-based and non-gradient based timing phase error detectors.

Other methods of timing recovery that are not based on a gradient strategy are well known in the art. For example, U.S. Pat. No. 5,872,815, entitled "Apparatus for generating timing signals for a digital television receiver," issued Feb. 16, 1999, describes a method of band edge extraction to generate a timing phase error signal. This and related methods are usually used to begin processing from a cold start. Previously described exemplary embodiments of the present invention employ SQM and adaptive control circuitry to select an error term among gradient-based choices. The present invention may be extended to select among timing phase error signals based on gradient strategies and timing phase error signals based on non-gradient based (e.g., band edge or related) strategies. FIG. 13 shows a fifth exemplary implementation of the timing phase detector of FIG. 6 switching between gradient-based and non-gradient based timing phase error detectors. For example, as illustrated in FIG. 13, SQM is used by controlling multiplexer 1320 to select between a gradient-based error term generated by phase detector 1310 and a non-gradient-based error term generated by band edge timing phase detector 1330.

Figure 12:
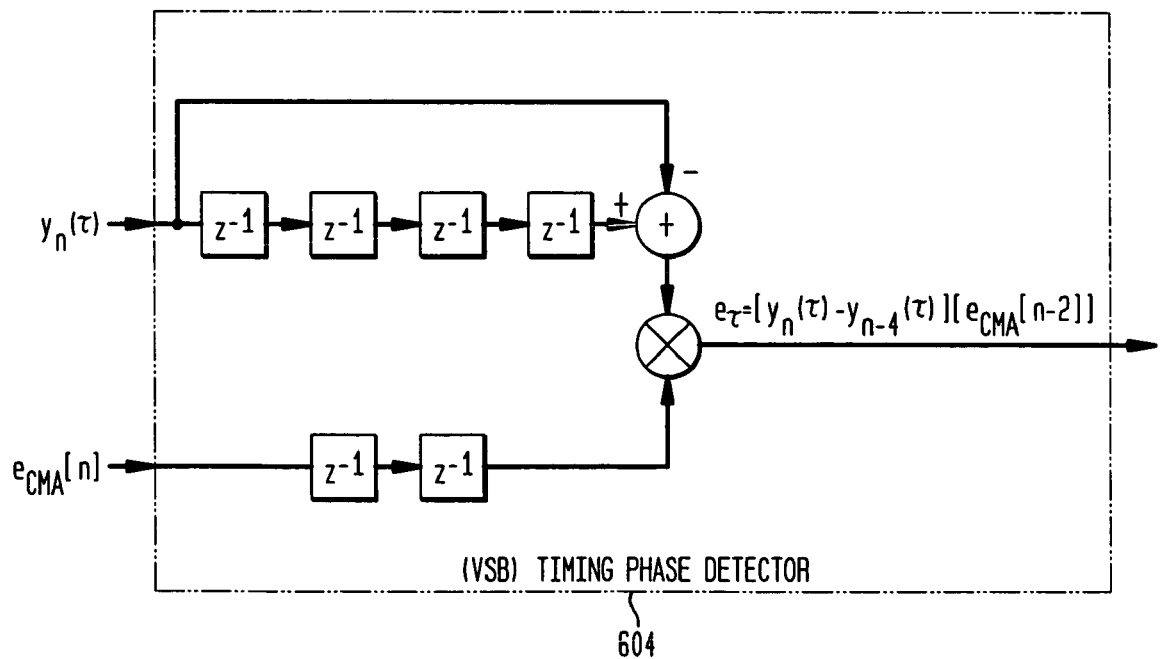
FIG. 12 shows the timing phase detector of FIG. 7 adapted for use in a vestigial sideband (VSB) receiver.

The first through fourth exemplary embodiments have been described with respect to timing phase detection and calculation of phase error $e_\tau$ for systems employing, for example, QAM modulation. However, one skilled in the art would realize that systems based on other types of modulation may require modification to the exemplary implementations. For example, for vestigial sideband modulation (VSB) systems, a VSB signal with carrier frequency $\omega_0 \pm (\pi/2)$ and with identical pulse and vestigial spectral shaping is equivalent to a staggered quadrature amplitude modulation (SQAM) with symbol spacing of period $T_s/2$. Thus, if symbol timing of the VSB signal is substantially intact, it may be converted to an SQAM signal by shifting its carrier frequency by ($F_s/4$), where $F_s$ is symbol frequency. The SQAM signal may then be converted to a QAM signal by delaying samples generated from the I signal component by one-half symbol period. For embodiments of the present invention designed for VSB systems, the circuit generating phase error $e_\tau$ substitutes two delay elements for each existing delay element in the first through fourth exemplary implementations to select symbols separated in time by period T. FIG. 12 illustrates modification of the first exemplary implementation of FIG. 7 adapted for use with VSB systems.

For VSB signals, a Single-Axis CM (SA-CM) criterion may be formed, as described in a paper by Shah et al, "Global convergence of a single-axis constant modulus algorithm," *Proceedings of the Statistical Signal and Array Processing Workshop*, Pocono Manor, Pa., August 2000, which is incorporated herein by reference, and also U.S. patent application Ser. No. 09/100,705, entitled "A reduced complexity blind equalizer for multi-mode signaling," filed on Jun. 19, 1998. The SA-CM criterion is based on real-part extraction of the equalizer output, and may be used for both real or complex-valued equalizer coefficients operating on both baseband or passband signals or sampled signals. A single-axis stochastic gradient derived from the SA-CM criterion (SA-CMA) may also be employed. For timing recovery, the methods of deriving a phase error signal using the CM criterion described herein may also use the SA-CM criterion and SA-CMA algorithm for VSB signals. Defining $y_n(\tau)$ as the complex-valued equalizer output, then the SA-CM criterion is given by $$J_{CM}=E[(\rho^2-Re\{y_n(\tau)\}^2)^2]$$

and the SA-CM error term is given by $$e_{SA\text{-}CMA}[n]=Re\{y_n(\tau)\}(\rho^2-Re\{y_n(\tau)\}^2)$$

where Re{●} denotes real-part extraction.

Since the CM error term is a cubic function of the signal $y_n(\tau)$, current implementations using finite precision may require large bit-width multipliers and accumulators. To reduce the computational burden, low-complexity implementations of the CMA error term have been developed, such as those described in U.S. patent application Ser. No. 09/231,888, entitled "Adaptive Equalizer with Enhanced Error Quantization," filed Jan. 14, 1999, and U.S. patent application Ser. No. 09/261,843 "Adaptive Equalizer with Decision Directed Constant Modulus Algorithm," filed March 1999, whose teachings are incorporated herein by reference. As would be apparent to one skilled in the art, the various methods of timing recovery described herein can be extended to include the use of quantized versions of blind error terms.

To reduce stochastic jitter, the CM error term may be modified by jointly equalizing and decoding. U.S. patent application Ser. No. 9/099,730 entitled "A Method of Estimating Trellis Encoded Symbols Utilizing Simplified Trellis Decoding," filed on Nov. 20, 2000, and U.S. patent application entitled "Data Slicer for Combined Trellis Decoding and Equalization," filed filed on Nov. 20, 2000, describe various decision devices which perform partial trellis decoding and which are incorporated herein by reference. For a VSB-modulated signal in accordance with the ATSC standard (an "ATSC 8-VSB signal"), the 8-level signal is decomposed into disjoint sets, each set with less than 8 elements (a "set-partitioned signal"). U.S. patent application Ser. No. 09/457,496, entitled "Equalizer method and apparatus using blind CMA equalization and partial decoding," filed Oct. 9, 1999, and incorporated herein by reference, employs the set-partitioned signals to define a new CM error term that incurs less stochastic jitter than the original CM error term. It is understood by one skilled in the art that such modified CM error terms may be employed in forming a phase error signal in accordance with the present invention.

Although the present invention is described herein with respect to the CM cost function, the present invention is not so limited and may be extended in general to timing phase recovery based on blind cost criteria as a class. For example, the Godard cost function G (which generalizes the CM cost function $J_{CM}$) is given by equation (9)

$$G=E[||y_n(\tau)|^p-\rho^p|^q], \qquad (9)$$

which leads to an update error term e[n] of the form given in equation (10):

$$e[n]=y_n(\tau)|y_n(\tau)|^{(p-2)}|y_n(\tau)|^p-\rho^p|_{(q-1)}\text{sign}(|y_n(\tau)|^p-\rho^p) \qquad (10)$$

Furthermore, the Bussgang class of blind cost functions admit an update error term e[n] of the form given in equation (11):

$$e[n]=(y_n(\tau)-g(y_n(\tau))), \qquad (11)$$

where g(●) is a non-linear, memoryless function. Such blind cost functions are described in Simon Haykin, *Blind Deconvolution*, Chapter 2, Prentice Hall, Englewood Cliffs, N.J., 1994, whose teachings are incorporated herein by reference. For example, for the CM criterion, $g(y_n(\tau))=(y_n(\tau)^3)/\rho^2$ is a scalar multiple of the error term $e_{CMA}[n]$ derived above. Other error terms include, but are not limited to, 1) the Sato cost function in which $g(y_n(\tau))=\gamma$ (sign $(y_n(\tau))$, where $\gamma$ is a scalar value and 2) the Benveniste-Goursat-Ruget cost function, in which $g(y_n(\tau))=-p(y_n(\tau))/p'(y_n(\tau))$, where p(●) denotes the probability density function of the variable $y_n(\tau)$ and p'(●) denotes the derivative of the probability density function with respect to the variable $y_n(\tau)$.

Another class of cost functions related to the Bussgang class, but not strictly inclusive, may be represented by the weighted sum of even moments of the observation, $y_n(\tau)$, expressed as $$J=\Sigma_k \lambda_k E[|y|^{2k}].$$

The present invention has been described with respect to a digital television receiver, and in particular, to digital television signals transmitted as symbols with m-ary quadrature amplitude modulation (QAM), an m-ary phase-shift keyed modulation (m-ary PSK), or a vestigial sideband modulation (VSB). However, one skilled in the art would realize that the techniques described herein may be applied to any receiver processing QAM, m-ary PSK, or VSB signals.

As would be apparent to one skilled in the art, the various functions of a timing recovery module and the timing phase detector may be implemented with circuit elements or may also be implemented in the digital domain as processing steps in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of timing recovery of symbols in a received signal, comprising the steps of:
   (a) generating a sequence of samples from the received signal with a sample period and sample phase related to a symbol rate of the symbols;
   (b) generating a phase error for a current sample from the sequence based on a gradient of a blind cost criterion of Bussgang-class cost functions;
   (c) adjusting at least one of the sample period and sample phase based on the phase error such that a magnitude of the phase error is driven to a predetermined point; and
   (d) repeating steps (a), (b), and (c) for subsequent samples so as to substantially recover timing of the symbols in the received signal, wherein step (b) comprises the steps of:
      (b1) calculating a blind cost error term based on the sample; and
      (b2) forming an approximation of a derivative of the received signal with respect to the sampling phase.

2. The invention as recited in claim 1, wherein step (b) further comprises the step of:
   (b3) combining the blind cost error term and the approximation to form the phase error.

3. The invention as recited in claim 1, further comprising the steps of (e) generating a quality measure for the received signal from the sequence; and wherein step (b1) further comprises the step of generating at least one other cost function error term based on a corresponding cost function criterion.

4. The invention as recited in claim 3, further comprising the steps of:
   b3) selecting an error value, based on the quality measure, as either the blind cost error term or the at least one other cost function error term; and
   b4) combining the error value with the approximation to form the phase error.

5. The invention as recited in claim 3, further comprising the steps of:
   b3) selecting an error value, based on the quality level, as a weighted combination of the blind cost error term and the at least one other cost function error term as the error value; and
   b4) combining the error value with the approximation to form the phase error.

6. The invention as recited in claim 3, wherein, for step (b) the at least one other cost function error term includes a least mean squares error term.

7. The invention as recited in claim 3, wherein, for step (b) the quality measure is based on at least one of a signal-to-noise ratio (SNR) of the received signal, SNR of a trellis decoder employed to detect each symbol, a number of symbols received, errors within a number of symbols received and detected, and vestigial sideband signal (VSB) framelock.

8. The invention as recited in claim 1, wherein, for step (b), either i) the blind cost criterion is a Constant Modulus (CM) cost criterion and the gradient is the CM error term or ii) the blind cost criterion is a Single-axis Constant Modulus (SA-CM) criterion and the gradient is a SA-CM error term.

9. The invention as recited in claim 8, wherein, for step (b) the CM cost criterion $J_{CM}$ is expressed as:

$$J_{CM} = E[(\rho^2 - |y_n(\tau)|^2)^2],$$

wherein $p^2$ is a dispersion constant, $y_n(\tau)$ is a discrete value representing the current sample generated at the sampling period, and $\tau$ represents the sampling phase; and wherein the gradient is $dJ_{CM}/d\tau$ and is expressed as:

$$dJ_{CM}/d\tau = (dJ_{CM}/dy_n(\tau))dy_n(\tau)/d\tau,$$

wherein the derivative of the signal with respect to the sampling phase is $dy_n(\tau)/d\tau$ and a derivative of $J_{CM}$ with respect to $y_n(\tau)$ is the blind cost error term determined as:

$$y_n(\tau)(\rho^2 - |y_n(\tau)|^2).$$

10. The invention as recited in claim 1, wherein, for step (b), the phase error is generated in accordance with a phase error calculation derived for a cost function error criterion having a corresponding cost function error term, the phase error calculation substituting the blind cost error term for the cost function error term.

11. The invention as recited in claim 10, wherein step (b1) comprises the steps of:
   calculating a blind cost error term for a current sample $y_n(\tau)$ and a blind cost error term for a previous sample $y_{n-1}(\tau)$, based on a gradient of a constant modulus (CM) cost criterion; and
   step (b2) comprises the step of combining the current and previous blind cost error terms with the current and previous samples generated at the sampling period to generate the timing phase error as:

$$y_n(\tau)y_{n-1}(\tau)\,((\rho^2 - |y_n(\tau)|^2) - (\rho^2 - |y_{n-1}(\tau)|^2))$$

where $\rho^2$ is a dispersion constant and $\tau$ represents the sampling phase.

12. The invention as recited in claim 1, wherein, for step (a) the received signal is demodulated from either a m-ary quadrature amplitude modulated (QAM) signal, a m-ary offset QAM signal, an m-ary phase-shift keyed modulated (m-ary PSK) signal, a vestigial sideband modulated (VSB) signal, a pulse amplitude modulated (PAM) signal, a signal modulated in accordance with a CCITT 802.11 standard, or a signal modulated in accordance with a V.27 standard.

13. The invention as recited in claim 1, wherein, for step (b), the Bussgang-class cost function is selected from either a Godard cost function, Benverniste-Goursat-Ruget cost function, or a Sato cost function.

14. The invention as recited in claim 1, wherein the method is embodied in a processor of an integrated circuit.

15. The invention as recited in claim 14, wherein the integrated circuit is embodied in a demodulator of a high definition television signal.

16. The invention as recited in claim 1, wherein, for step (a), the received signal is a vestigial sideband (VSB) modulated signal, and, for step (b) the blind cost criterion is a Single-axis Constant Modulus (SA-CM) criterion and the gradient is a SA-CM error term.

17. The invention as recited in claim 1, wherein, for step (a), the received signal is a digital television signal having data encoding and modulation in accordance with an ATSC standard.

18. Apparatus for timing recovery of a symbol rate for symbols in a received signal, comprising:

a timing reference providing a reference signal;

a sample generator configured to generate a sequence of samples from the received signal with a sample period and sample phase based on the reference signal and related to the symbol rate;

a blind cost error term generator configured to generate a blind cost error term for a current sample of the sequence in accordance with a gradient of a blind cost criterion of Bussgang-class cost functions; and a timing phase detector configured to generate a phase error for the current sample from the sequence and based on the blind cost error term;

wherein the timing reference modifies the reference signal based on the phase error to adjust at least one of the sample period and sample phase such that a magnitude of the phase error is driven to zero so as to substantially recover timing of the symbols in the received signal; and wherein the timing phase detector forms an approximation of a derivative of the received signal with respect to the sampling phase.

19. The invention as recited in claim 18, wherein the timing phase detector combines the blind cost error term and the approximation to form the phase error.

20. The invention as recited in claim 19, wherein the timing phase detector includes a filter having a delay chain receiving the sequence and a combiner, and the combiner forms the derivative of the signal with respect to the sampling phase by generating the difference between a previous sample from a corresponding delay of the delay chain and the current sample.

21. The invention as recited in claim 19, wherein the blind cost criterion is the Constant Modulus (CM) cost criterion and the gradient is the CM error term, and wherein the blind cost error term is generated by forming the gradient of the CM cost criterion as $dJ_{CM}/d\tau$ expressed as:

$$dJ_{CM}/d\tau=(dJ_{CM}/dy_n(\tau))dy_n(\tau)/d\tau,$$

wherein the CM cost criterion $J_{CM}$ is defined as:

$$J_{CM}=E[(\rho^2-|y_n(\tau)|^2)^2]$$

in which $\rho^2$ is a dispersion constant, $y_n(\tau)$ is a discrete value representing the current sample generated at the sampling period, and $\tau$ represents the sampling phase; and wherein the derivative of the received signal with respect to the sampling phase is $dy_n(\tau)/d\tau$ and a derivative of $J_{CM}$ with respect to $y_n(\tau)$ is the blind cost error term given by $$y_n(\tau)(\tau^2-|y_n(\tau)|^2).$$

22. The invention as recited in claim 18, wherein the phase detector generates the phase error in accordance with a phase error calculation derived for a cost function error criterion having a corresponding cost function error term, the phase error calculation substituting the blind cost error term for the cost function error term.

23. The invention as recited in claim 22, wherein the blind-cost error term is based on a gradient of a constant modulus (CM) cost criterion for the current sample defined as $$dJ_{CM}/d\tau=(dJ_{CM}/dy_n(\tau))dy_n(\tau)/d\tau,$$

wherein $J_{CM}=E[(\rho^2-|y_n(\tau)|^2)^2]$ is the CM cost criterion, $\rho^2$ is a dispersion constant, $y_n(\tau)$ is a discrete value representing the current sample generated at the sampling period, $\tau$ represents the sampling phase, and $dy_n(\tau)/d\tau$ is a derivative of the received signal with respect to the sampling phase, and a derivative of $J_{CM}$ with respect to $y_n(\tau)$ is defined as the blind cost error term $e_{CMA}[n]$ given by $$e_{CMA}[n]=y_n(\tau)(\rho^2-|y_n(\tau)|^2); \text{ and}$$

wherein the timing phase detector combines a current blind cost error term $e_{CMA}[n]$ and a previous blind cost error term $e_{CMA}[n-1]$ with the current sample $y_n(\tau)$ and previous sample $y_{n-1}(\tau)$ to generate the timing phase error as:

$$y_n(\tau)y_{n-1}(\tau)\ ((\rho^2-|y_n(\tau)|^2)-(\rho^2-|y_{n-1}(\tau)|^2)).$$

24. The invention as recited in claim 18, wherein the sample generator comprises an analog-to-digital (A/D converter) configured to generate a sequence of discrete values from the received signal.

25. The invention as recited in claim 24, wherein the timing reference is an oscillator coupled to the A/D converter, and the A/D converter generates the sequence of discrete values so as to convert the received signal to the sequence of samples with the sampling phase and the sampling period.

26. The invention as recited in claim 24, wherein the sample generator further comprises an interpolator coupled to the A/D converter and coupled to the timing reference generator, wherein the interpolator is configured to adjust the sequence of discrete values from the A/D converter to form the sequence of samples with the sampling period and the sampling phase.

27. The invention as recited in claim 24, wherein the received signal is demodulated from either a m-ary quadrature amplitude modulated (QAM) signal, a m-ary offset QAM signal, an m-ary phase-shift keyed modulated (m-ary PSK) signal, a vestigial sideband modulated (VSB) signal, a pulse amplitude modulated (PAM) signal, a signal modulated in accordance with a CCITT 802.11 standard, or a signal modulated in accordance with a V.27 standard.

28. The invention as recited in claim 18, further comprising 1) a signal quality processor generating a signal quality measure (SQM) signal, and 2) at least one cost function error generator, each cost function error generator configured to generate a cost function error term with a corresponding cost function criterion.

29. The invention as recited in claim 28, further comprising a weighting mechanism circuit, the weighting mechanism circuit forming, based on the SQM signal, a weighted combination of i) the blind cost error term with ii) the at least one cost function error term, and wherein the timing phase detector, based on the SQM signal, generates the phase error with the weighted combination.

30. The invention as recited in claim 28, wherein the SQM signal is based on at least one of a signal-to-noise ratio (SNR) of the received signal, SNR of a trellis decoder employed to detect each symbol, a number of symbols received, errors within a number of symbols received and detected, and ATSC frame synchronization acquisition.

31. The invention as recited in claim 18, further comprising a multiplexer selecting either the blind cost error term or at least one cost function error term based on the SQM signal; and wherein the timing phase detector, based on the SQM signal, either i) provides the phase error generated with the blind cost error term or ii) provides the phase error based on the selected cost function error term from the multiplexer.

32. The invention as recited in claim 18, wherein the blind cost error generator is included in an adaptive equalizer, the blind cost error generator forming the blind cost error term to update equalizer coefficients.

33. The invention as recited in claim 18, wherein the Bussgang-class cost function is selected from either a Godard cost function, Benveniste-Goursat-Ruget cost function, or a Sato cost function.

34. The invention as recited in claim 18, wherein the apparatus is embodied in an integrated circuit.

35. The invention as recited in claim 34, wherein the apparatus is embodied in a demodulator of a high definition television signal.

36. The invention as recited in claim 18, wherein the received signal is a vestigial sideband (VSB) modulated signal, and the blind cost criterion is a Single-axis Constant Modulus (SA-CM) criterion and the gradient is a SA-CM error term.

37. The invention as recited in claim 18, wherein the received signal is a digital television signal having data encoding and modulation in accordance with an ATSC standard.

38. A computer-readable medium having stored thereon a plurality of instructions, the plurality of instructions including instructions which, when executed by a processor, cause the processor to implement a method for timing recovery of symbols in a received signal, the method comprising the steps of:

(a) generating a sequence of samples from the received signal with a sample period and sample phase related to a symbol rate of the symbols;

(b) generating a phase error for a current sample from the sequence based on a gradient of a blind cost criterion of Bussgang-class cost functions;

(c) adjusting at least one of the sample period and sample phase based on the phase error such that a magnitude of the phase error is driven to zero; and (d) repeating steps (a), (b), and (c) for subsequent samples so as to substantially recover timing of the symbols in the received signal wherein step (b) comprises the steps of:

(b1) calculating a blind cost error term based on the sample; and (b2) forming an approximation of a derivative of the received signal with respect to the sampling phase.

39. The invention as recited in claim 38, wherein step (b) further comprises the step of:

(b3) combining the blind cost error term and the approximation to form the phase error.

40. A method of timing recovery of symbols in a received signal, comprising the steps of:

(a) generating a sequence of samples from the received signal with a sample period and sample phase related to a symbol rate of the symbols;

(b) generating a phase error for a current sample from the sequence based on a gradient of a blind cost criterion of Bussgang-class cost functions;

(c) adjusting at least one of the sample period and sample phase based on the phase error such that a magnitude of the phase error is driven to a predetermined point; and (d) repeating steps (a), (b), and (c) for subsequent samples so as to substantially recover timing of the symbols in the received signal, wherein:

for step (b), the phase error is generated in accordance with a phase error calculation derived for a cost function error criterion having a corresponding cost function error term, the phase error calculation substituting the blind cost error term for the cost function error term;

step (b) comprises the steps of:

(b1) calculating a blind cost error term for a current sample $y_n(\tau)$ and a blind cost error term for a previous sample $y_{n-1}(\tau)$, based on a gradient of a constant modulus (CM) cost criterion; and (b2) combining the current and previous blind cost error terms with the current and previous samples generated at the sampling period to generate the timing phase error as:

$$y_n(\tau)y_{n-1}(\tau)\ ((\rho^2-|y_n(\tau)|^2)-(\rho^2-|y_{n-1}(\tau)|^2))$$

where $\rho^2$ is a dispersion constant and $\tau$ represents the sampling phase.

41. Apparatus for timing recovery of a symbol rate for symbols in a received signal, comprising:

a timing reference providing a reference signal;

a sample generator configured to generate a sequence of samples from the received signal with a sample period and sample phase based on the reference signal and related to the symbol rate;

a blind cost error term generator configured to generate a blind cost error term for a current sample of the sequence in accordance with a gradient of a blind cost criterion of Bussgang-class cost functions; and a timing phase detector configured to generate a phase error for the current sample from the sequence and based on the blind cost error term, wherein:

the timing reference modifies the reference signal based on the phase error to adjust at least one of the sample period and sample phase such that a magnitude of the phase error is driven to zero so as to substantially recover timing of the symbols in the received signal;

the phase detector generates the phase error in accordance with a phase error calculation derived for a cost function error criterion having a corresponding cost function error term, the phase error calculation substituting the blind cost error term for the cost function error term;

the blind-cost error term is based on a gradient of a constant modulus (CM) cost criterion for the current sample defined as $$dJ_{CM}/d\tau=(dJ_{CM}/dy_n(\tau))dy_n(\tau)/d\tau,$$

wherein $J_{CM}=E[(\rho^2-|y_n(\tau)|_2]$ is the CM cost criterion, $\rho^2$ is a dispersion constant, $y_n(\tau)$ is a discrete value representing the current sample generated at the sampling period, $\tau$ represents the sampling phase, and $dy_n(\tau)/d\tau$ is a derivative of the received signal with respect to the sampling phase, and a derivative of $J_{CM}$ with respect to $y_n(\tau)$ is defined as the blind cost error term $e_{CMA}[n]$ given by $$e_{CMA}[n] = y_n(\tau)(\rho^2 - |y_n(\tau)|^2); \text{ and}$$

wherein the timing phase detector combines a current blind cost error term $e_{CMA}[n]$ and a previous blind cost error term $e_{CMA}[n-1]$ with the current sample $y_n(\tau)$ and previous sample $y_{n-1}(\tau)$ to generate the timing phase error as:

$$y_n(\tau)y_{n-1}(\tau)\,((\rho^2-|y_n(\tau)|^2)-(\rho^2-|y_{n-1}(\tau)|^2)).$$

* * * * *

UNITED STATES PATENT AND TRADEMARK OFFICE
CERTIFICATE OF CORRECTION

PATENT NO. : 6,985,549 B1
DATED : January 10, 2006
INVENTOR(S) : Stephen L. Biracree et al.

It is certified that error appears in the above-identified patent and that said Letters Patent is hereby corrected as shown below:

<u>Column 22,</u>
Line 63, replace " $J_{CM} = E\left[(p^2 - |y_n(\tau)|_2\right]$ " with -- $J_{CM} = E\left[(p^2 - |y_n(\tau)|^2)^2\right]$ --.

Signed and Sealed this

Ninth Day of May, 2006

JON W. DUDAS
*Director of the United States Patent and Trademark Office*